(12) United States Patent
Merchant et al.

(10) Patent No.: US 9,063,898 B1
(45) Date of Patent: Jun. 23, 2015

(54) METHOD OF RESTORING BACKUP DATA

(75) Inventors: Arif Merchant, Los Altos, CA (US);
Kimberly Keeton, San Francisco, CA (US); Alistair Veitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1577 days.

(21) Appl. No.: 10/997,020

(22) Filed: Nov. 23, 2004

(51) Int. Cl.
*G06F 7/00* (2006.01)
*G06F 11/14* (2006.01)

(52) U.S. Cl.
CPC ............ *G06F 11/1469* (2013.01); *G06F 11/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,210,866 A | * | 5/1993 | Milligan et al. | 714/6 |
| 5,720,026 A | * | 2/1998 | Uemura et al. | 714/6 |
| 5,745,669 A | * | 4/1998 | Hugard et al. | 714/3 |
| 5,754,782 A | * | 5/1998 | Masada | 709/213 |
| 6,141,773 A | * | 10/2000 | St. Pierre et al. | 714/20 |
| 6,366,986 B1 | * | 4/2002 | St. Pierre et al. | 711/162 |
| 6,675,177 B1 | | 1/2004 | Webb | |
| 6,691,212 B1 | | 2/2004 | McNeil et al. | |
| 6,766,412 B2 | | 7/2004 | Bolt | |
| 6,850,958 B2 | * | 2/2005 | Wakabayashi | 707/204 |
| 7,107,486 B2 | * | 9/2006 | Okada et al. | 714/20 |
| 7,251,749 B1 | * | 7/2007 | Fong et al. | 714/20 |
| 7,334,006 B1 | * | 2/2008 | Cabrera | 707/204 |
| 2003/0177149 A1 | * | 9/2003 | Coombs | 707/204 |
| 2003/0182301 A1 | * | 9/2003 | Patterson et al. | 707/102 |
| 2003/0182326 A1 | * | 9/2003 | Patterson | 707/204 |
| 2004/0093361 A1 | * | 5/2004 | Therrien et al. | 707/204 |
| 2004/0236916 A1 | * | 11/2004 | Berkowitz et al. | 711/162 |
| 2005/0071390 A1 | * | 3/2005 | Midgley et al. | 707/204 |
| 2006/0004890 A1 | * | 1/2006 | Semple et al. | 707/204 |
| 2007/0022145 A1 | * | 1/2007 | Kavuri | 707/204 |

OTHER PUBLICATIONS

Ann L. Chervenak, Vivekanand Vellanki, Zachary Kurmas, Protecting File Systems: A Survey of Backup Techniques, 1998.
Kimberly Keeton and Arif Merchant, A Framework for Evaluating Storage System Dependability, HP Labs, Palo Alto, CA, Jul. 2004.

* cited by examiner

*Primary Examiner* — Apu Mofiz
*Assistant Examiner* — Thu Nga Nguyen
(74) *Attorney, Agent, or Firm* — Westberg Law Offices

(57) ABSTRACT

An embodiment of a method of restoring backup data comprises first and second steps that preferably are executed at least partially in parallel. The first step restores an incremental backup. The second step selectively restores a full backup. The selective restoration of the full backup disregards units of data that were restored from the incremental backup and restores a remainder of the full backup. In an alternative embodiment, the first step precedes the second step. In another alternative embodiment, the selective restoration of the full backup accesses a table that indicates the units of data contained in the incremental backup to determine which units of data to disregard in the full backup.

20 Claims, 3 Drawing Sheets

METHOD OF RESTORING BACKUP DATA

FIELD OF THE INVENTION

The present invention relates to the field of data storage. More particularly, the present invention relates to the field of data storage where backup copies of data are used to restore corrupted or lost data.

BACKGROUND OF THE INVENTION

Data is frequently protected by making a backup of the data. A full backup copies an entire data set. A cumulative incremental backup copies data modified since the most recent full backup. A differential incremental backup copies data modified since the most recent backup of any kind. Typically, the storage media for backups is tape. However, other media such as disks can be used. If data is lost, it may be restored using the most recent full backup and appropriate incremental backups that follow it. If data is corrupted or it is desired to obtain previously deleted data, a full backup and appropriate incremental backups may be used to restore data to its state at some point-in-time.

To restore data from a full backup and one or more incremental backups, the full backup is restored and then the incremental backups are restored in the order that they were made. For example, consider a backup technique that makes a full backup on Sunday, differential incremental backups on Monday, Tuesday, Thursday, and Friday, and a cumulative incremental backup on Wednesday. If data is lost on Friday before the Friday incremental backup, the Sunday full backup is restored followed by the Wednesday cumulative incremental backup and then the Thursday differential incremental backup. This may take a considerable amount of time. It may also include restoring particular data blocks or files multiple times if they are opened and saved often. While the need to restore backup data is rare, when the need does arise there is often a desire to accomplish the restoration quickly.

What is needed is a method of efficiently restoring backup data.

SUMMARY OF THE INVENTION

The present invention comprises a method of restoring backup data. According to an embodiment, the method comprises first and second steps that preferably are executed at least partially in parallel. The first step restores an incremental backup. The second step selectively restores a full backup. The selective restoration of the full backup disregards units of data that were restored from the incremental backup and restores a remainder of the full backup. In an alternative embodiment, the first step precedes the second step. In another alternative embodiment, the selective restoration of the full backup accesses a table that indicates the units of data contained in the incremental backup to determine which units of data to disregard in the full backup.

According to another embodiment, the method of restoring the backup data begins with a step of accessing units of data from a plurality of incremental backups and a full backup at least partially in parallel. For each unit of data accessed from the incremental backups, the method employs a step of writing an incremental timestamp and restoring the unit of data if a later incremental timestamp for the unit of data is not present. For each unit of data accessed from the full backup, the method employs a step of restoring the unit of data if the incremental timestamp for the unit of data is not present.

According to embodiments, the units of data comprise data blocks, files, database records, or some other unit of data.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of restoring backup data. The backup data comprises a full backup and one or more incremental backups. The full backup is a copy of a data set. For example, the data set may be a storage volume. Alternatively, the data set may be a portion of a storage volume or multiple storage volumes. The incremental backups are copies of modified data within the data set. An incremental backup may be a cumulative incremental backup or a differential incremental backup. The cumulative incremental backup is a copy of data that was modified after making the full backup. The differential incremental backup is a copy of data that was modified after making a prior backup, regardless of whether it was a full backup, a differential incremental backup, or a cumulative incremental backup.

The method of restoring backup data of the present invention may be employed on a range of computer systems. For example, it may be employed on an individual computer (e.g., a personal computer) that includes a storage device and one or more backup storage devices. It may be employed in a network environment that includes network-attached storage and one or more backup storage devices. Or, it may be employed in a storage system that includes disk arrays and a tape library.

Figure 1:
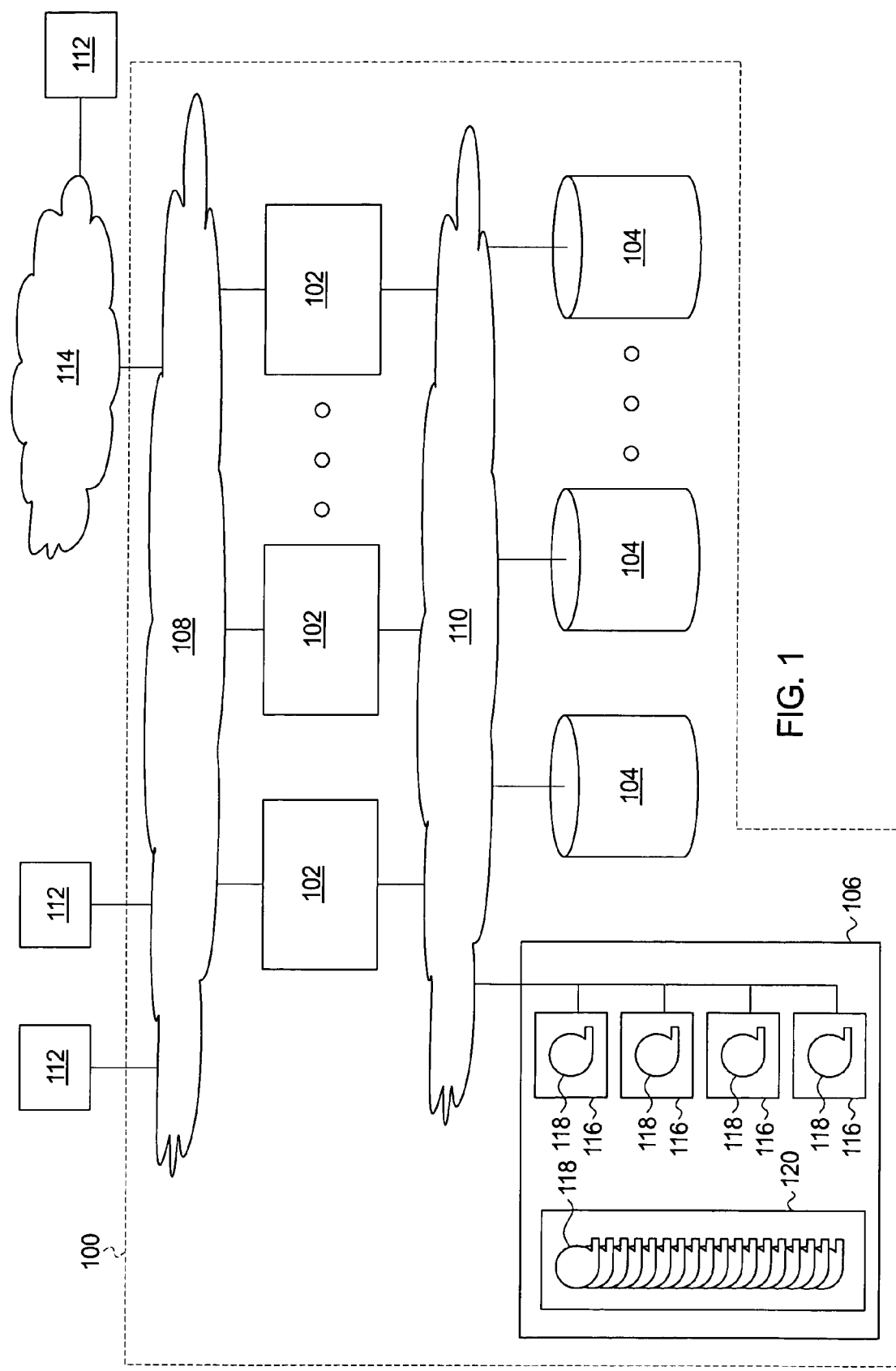
FIG. 1 schematically illustrates an embodiment of a storage system that employs a method of restoring backup data of the present invention.

An embodiment of a storage system that employs the method of restoring backup data of the present invention is illustrated schematically in FIG. 1. The storage system 100 comprises host computers 102, disk arrays 104, a tape library 106, a LAN (local area network) 108, and a SAN (storage area network) 110. The LAN 108 couples the host computers 102 together. The SAN 110 couples the host computers 102 to the disk arrays 104 and the tape library 106. The disk arrays 104 may be divided into storage volumes. In normal operation, clients 112, which couple to the LAN 108 directly or via a WAN 114, access the disk arrays 104. Periodically, the tape library 106 makes backups of data within the disk arrays 104.

The tape library 106 comprises tape storage devices (i.e., tape drives) 116 and tapes 118. A mechanism (not shown) moves the tapes 118 between a tape magazine 120 and the tape storage devices 116. The tape library 106 may perform backups of multiple storage volumes simultaneously using the tape storage devices 116. For example, four of the tape storage devices 116 may backup four storage volumes simultaneously. Alternatively, four of the tape storage devices 116 may backup four portions of one or more storage volumes simultaneously. (Note that while the tape library 106 is depicted with four of the tape storage devices it may include more or less of the tape storage devices 116.)

Figure 2:
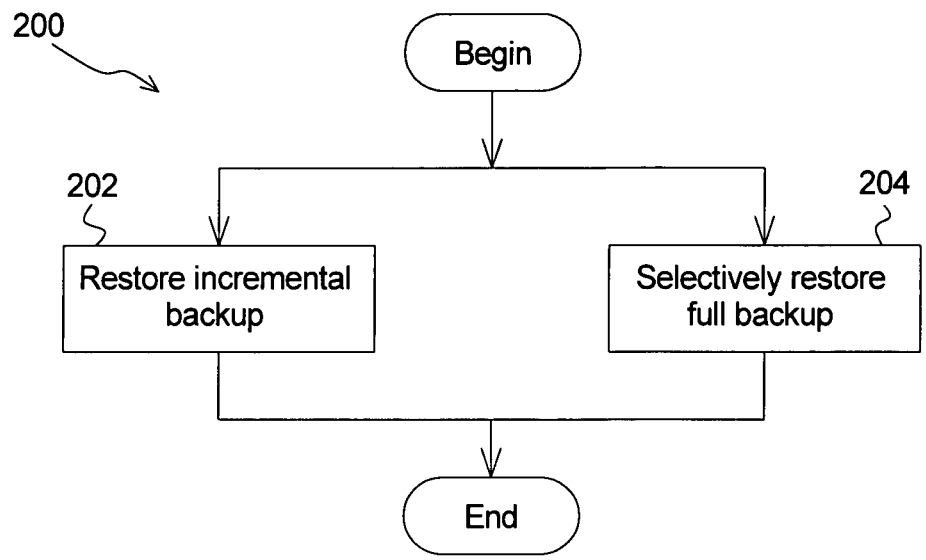
FIG. 2 illustrates an embodiment of a method of restoring backup data of the present invention as a flow chart.

An embodiment of a method of restoring backup data of the present invention is illustrated as a flow chart in FIG. 2. The method 200 comprises first and second steps, 202 and 204, which preferably take place at least partially in parallel. Alternatively, the first step 202 precedes the second step 204. In the first step 202, the method 200 restores an incremental backup, which comprises units of data. The units of data may be data blocks, files, database records, or some other data units such as bytes or words (i.e., a plurality of bytes). The first step 202 includes storing an indicator for each unit of data restored from the incremental backup. The indicator may be a bit, a flag, a timestamp, or some other indicator.

In the second step 204, the method 200 selectively restores a full backup. This includes disregarding units of data that have been restored from the incremental backup and restoring a remainder of the full backup. The method 200 determines which units of data have been restored from the incremental backup by looking for the indicator for each of the units of data that is about to be restored. During a parallel instantiation of the first and second steps, 202 and 204, the second step 204 may restore one or more particular units of data that are contained within both the full backup and the incremental backup but which have not yet been restored from the incremental backup. Since the first step 202 restores the incremental backup, the one or more particular units of data restored from the full backup in the second step 204 will be overwritten in the first step 202.

The method 200 may be employed to restore a most recent incremental backup. For example, a failure of a storage array will generally be recognized as soon as it occurs. In such a situation, if the most recent incremental backup is a cumulative incremental backup, restoring it along with the full backup will restore data to its most recently backed up state. Alternatively, the method 200 may be employed to restore a point-in-time incremental backup. For example, a security attack may corrupt data over several incremental backups before the security attack is recognized. In such a situation, if the point-in-time incremental backup immediately preceding the security attack is a cumulative incremental backup, restoring it along with the full backup will restore data to a pre-attack backed up state.

Figure 3:
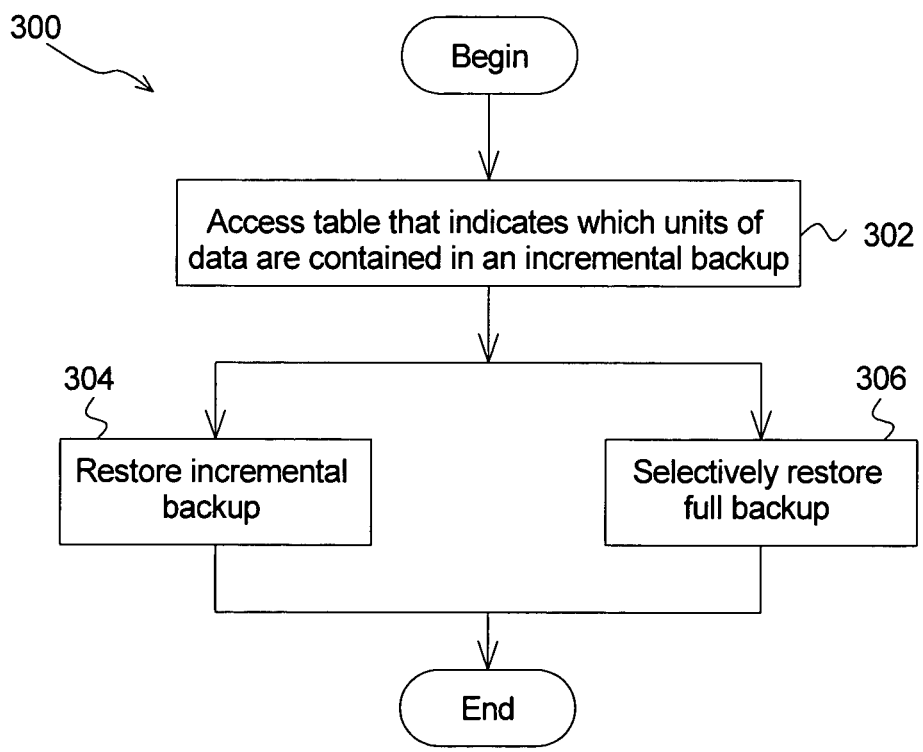
FIG. 3 illustrates an embodiment of a method of restoring backup data of the present invention as a flow chart.

Another embodiment of a method of restoring backup data of the present invention is illustrated in FIG. 3 as a flow chart. The method 300 comprises first through third steps, 302 . . . 306. In an embodiment, the second and third steps, 304 and 306, are performed at least partially in parallel. In other embodiments, the second step 304 precedes the third step 306 or the third step 306 precedes the second step 304. While the second step 304 may precede the first step 302, the third step 306 either executes in parallel with the first step 302 or follows the first step 302.

In an embodiment, the method 300 begins with the first step 302 of accessing a table that indicates which units of data are contained within an incremental backup. Preferably, the table resides on the storage media that holds the incremental backup. More preferably, the table precedes the incremental backup so that it may be conveniently accessed prior to restoring the incremental backup. Alternatively, the table resides elsewhere. For example, the table may reside on the storage media that holds the full backup. In the second step 304, the method restores the incremental backup. In the third step 306, the method 300 selectively restores the full backup by disregarding the units of data indicated in the table and restoring a remainder of the units of data within the full backup.

Figure 4:
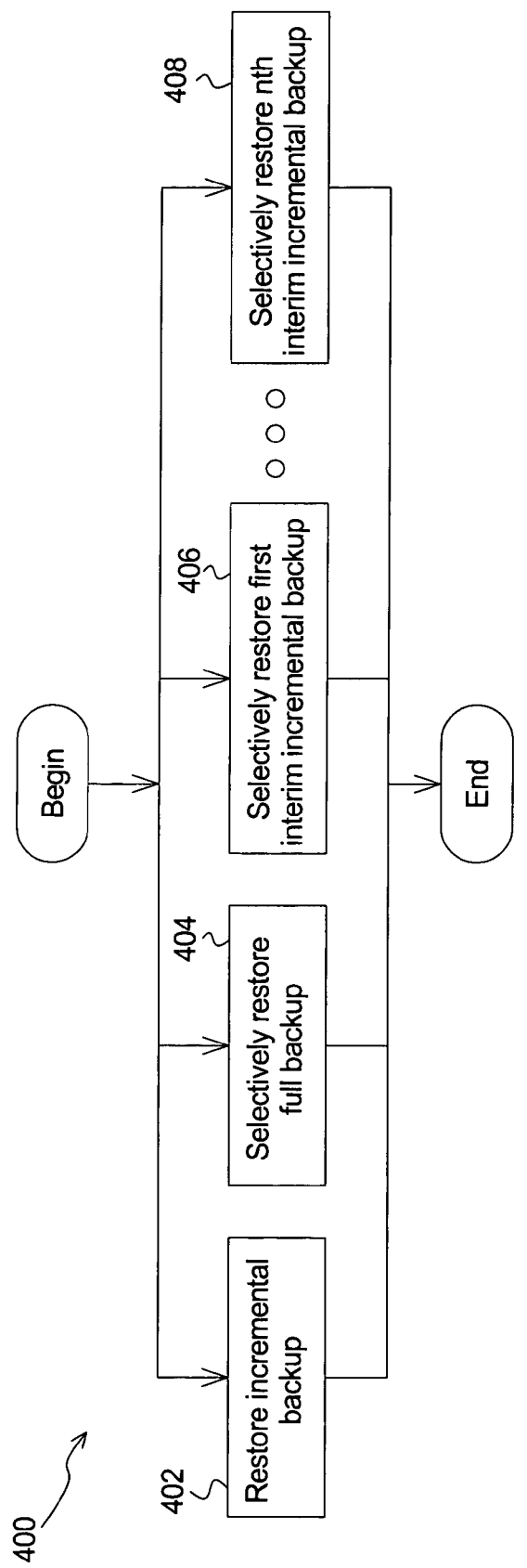
FIG. 4 illustrates an embodiment of a method of restoring backup data of the present invention as a flow chart.

Another embodiment of a method of restoring backup data of the present invention is illustrated as a flow chart in FIG. 4. The method 400 comprises restoring a most recent incremental backup in first step 402, selectively restoring a full backup in a second step 404, and selectively restoring one or more interim incremental backups in a third step 406 or third through nth steps, 406 . . . 408. The most recent incremental backup may be the most recently stored interim backup or it may be a backup that is most recent to some point-in-time. The one or more interim incremental backups comprise incremental backups made at times in between the time that the full backup was made and the time that the most recent incremental backup was made. In an embodiment, the first through nth steps, 402 . . . 408, take place at least partially in parallel. In other embodiments, groups of the first through nth steps, 402 . . . 408, take place at least partially in parallel. In another embodiment, the first through nth steps, 402 . . . 408, take place serially: The most recent incremental backup is restored prior to restoring other backups (the first step 402), the interim incremental backups are restored in order of most recent to most distant (the first through nth steps, 404 . . . 408), and the full backup is restored last (the second step 404).

In the first step 402, the method 400 restores the most recent incremental backup. In the third through nth steps, 406 . . . 408, the method 400 selectively restores the one or more interim incremental backups by disregarding units of data that have been restored from a more recent incremental backup and restoring a remainder of the units of data within the interim incremental backups. In the second step 404, the method 400 selectively restores the full backup by disregarding the units of data that have been restored from the incremental backups and restoring a remainder of the units of data within the full backup.

In an embodiment, the method 400 stores a timestamp for each unit of data restored from the incremental backups. The timestamp indicates which incremental backup restored the unit of data. Preferably, the timestamp indicates the hierarchy of incremental backups while avoiding superfluous information. (Alternatively, the timestamp indicates day of the week and time, or date and time, or some other unique timestamp.) For example, if any restoration of data by the method 400 restores data from the most recent incremental backup, two interim incremental backups, and a full backup, a two-bit timestamp suffices. In this example, backups may be made on a weekly schedule with a full backup on Sunday, differential incremental backups on Monday and Tuesday, a cumulative incremental backup on Wednesday, and differential incremental backups on Thursday and Friday.

If the restoration restores backup data to a time prior to the Wednesday backup, the Monday and Tuesday differential incremental backups may be indicated by zero and one (0 and 1), respectively. If the restoration restores backup data to a time subsequent to the Wednesday backup, the Wednesday cumulative incremental backup may be indicated by zero (00), and the Thursday and Friday differential incremental backups may be indicated by one and two (01 and 10). A similar scheme using the two-bit timestamp may be implemented in which a differential incremental backup is made on Wednesday, the cumulative backup is made on Thursday, and an additional differential incremental backup is made on Friday.

More generally, an n-bit unique identifier may be used for the timestamp where n is determined from $\log_2$(no. of incremental backups to be restored) rounded up to an integer. For example, if there are six incremental backups to be restored n $\log_2(6)=2.585$, which is rounded up to 3. Of course, more bits may be allotted for storing the n-bit unique identifiers. For example, three-bit unique identifiers could be stored in byte addresses for convenience. Further, if an n-bit unique identifier suffices and n is less than some number m, m-bit identifiers will also suffice. For example, if the three-bit identifiers suffice, byte identifiers will also suffice.

In another embodiment, a table is associated with each of the incremental backups. Each table indicates the units of data contained within a particular incremental backup. In this embodiment, the third through nth steps, 406 . . . 408, of selectively restoring the interim incremental backups and the second step of selectively restoring the full backup refer to the tables for more recent incremental backups to determine which units of data to disregard. Preferably, the storage media for each incremental backup includes the table for the incremental backup on the storage media. More preferably, the table precedes the incremental backup so that it may be accessed prior to restoring the incremental backup. Alternatively, the tables are stored on a different storage media such as the storage media that holds the full backup or the storage media that holds the incremental or full backup that is just earlier than the incremental backup that the table lists (e.g., the table for a Tuesday differential incremental backup is placed on the storage media that holds the Monday incremental backup) or on a separate storage media that does not contain any of the backups (e.g., a different disk array).

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of restoring backup data comprising:
    accessing separate data structures of respective incremental backups, each of the data structures indicating units of data contained in the respective incremental backup and each incremental backup including copies of data within a data set that was modified during a corresponding time period;
    selectively restoring an interim one of the incremental backups, wherein selectively restoring the interim incremental backup comprises:
        disregarding units of data in the interim incremental backup that are identified as present in a more recent one of the incremental backups based on accessing the data structure of the more recent incremental backup, and
        restoring a remainder of the interim incremental backup excluding the disregarded units of data in the interim incremental backup; and
    selectively restoring a full backup, wherein selectively restoring the full backup comprises:
        disregarding units of data in the full backup that are identified as present in the incremental backups based on accessing the data structures of the respective incremental backups, and
        restoring a remainder of the full backup excluding the disregarded units of data in the full backup.

2. The method of claim 1 wherein the units of data are selected from among data blocks, files, or database records.

3. The method of claim 1 wherein selectively restoring the interim incremental backup and selectively restoring the full backup occur at least partially in parallel.

4. The method of claim 1 wherein the interim incremental backup comprises a cumulative incremental backup and the more recent incremental backup is more recently created than the interim incremental backup and comprises a differential incremental backup.

5. A system comprising:
    at least one processor to:
    access separate data structures of respective incremental backups, each of the data structures indicating units of data contained in the respective incremental backup and each incremental backup including copies of all data within a data set that was modified during a corresponding time period;
    selectively restore an interim one of the incremental backups, which comprises:
        disregarding units of data in the interim incremental backup that are identified as present in a more recent one of the incremental backups based on accessing the data structure of the more recent incremental backup, and
        restoring a remainder of the interim incremental backup, the remainder of the interim incremental backup excluding the disregarded units of data in the interim incremental backup; and
    after completion of the selective restoring of the interim incremental backup, selectively restore a full backup, which comprises:
        disregarding units of data in the full backup that are identified as present in the incremental backups based on accessing the data structures of the respective incremental backups, and
        restoring a remainder of the full backup, the remainder of the full backup excluding the disregarded units of data in the full backup.

6. The system of claim 5 wherein the units of data comprise data blocks.

7. The system of claim 5 wherein the units of data comprise files.

8. The system of claim 5 herein the units of data comprise database records.

9. A non-transitory computer readable media comprising computer code for restoring backup data, the computer code upon execution causing a computer system to:
    access separate data structures of respective incremental backups, each of the data structures indicating units of data contained in the respective incremental backup and each incremental backup including copies of data within a data set that was modified during a corresponding time period;
    selectively restore an interim one of the incremental backups, wherein selectively restoring the interim incremental backup comprises:
        disregarding units of data in the interim incremental backup that are identified as present in a more recent one of the incremental backups based on accessing the data structure of the more recent incremental backup, and
        restoring a remainder of the interim incremental backup excluding the disregarded units of data in the interim incremental backup; and
    selectively restore a full backup, wherein selectively restoring the full backup comprises:
        disregarding units of data in the full backup that are identified as present in the incremental backups based on accessing the data structures of the respective incremental backups, and
        restoring a remainder of the full backup excluding the disregarded units of data in the full backup.

10. The method of claim 1, wherein the data structures comprise tables.

11. The method of claim 10, wherein the tables are contained within the respective incremental backups.

12. The method of claim 10, wherein each of the tables precedes the respective increment backup on a storage medium.

13. The method of claim 1, wherein the selective restoring of the full backup occurs after completion of the selective restoring of the interim incremental backup.

14. The system of claim 5, wherein the data structures comprise tables.

15. The system of claim 5, wherein the data structures are contained within the respective incremental backups.

16. The non-transitory computer readable media of claim 9, wherein the data structures comprise tables.

17. The non-transitory computer-readable media of claim 9, wherein the data structures are contained within the respective incremental backups.

18. The method of claim 1, wherein restoring the backup data comprising restoring the backup data to a point in time by:
 restoring the more recent one of the incremental backups, and performing the selective restoring of the interim incremental backup and the selective restoring of the full backup,
 wherein the selective restoring of the interim incremental backup occurs after restoring the more recent one of the incremental backups, and wherein the selective restoring of the full backup occurs after the selective restoring of the interim incremental backup.

19. The system of claim 5, wherein the at least one processor is to restore backup data to a point in time by:
 restoring the more recent one of the incremental backups, and performing the selective restoring of the interim incremental backup and the selective restoring of the full backup,
 wherein the selective restoring of the interim incremental backup occurs after the restoring of the more recent one of the incremental backups.

20. The non-transitory computer readable media of claim 9, wherein restoring the backup data comprising restoring the backup data to a point in time by:
 restoring the more recent one of the incremental backups, and performing the selective restoring of the interim incremental backup and the selective restoring of the full backup,
 wherein the selective restoring of the interim incremental backup occurs after restoring of the more recent one of the incremental backups, and wherein the selective restoring of the full backup occurs after the selective restoring of the interim incremental backup.

\* \* \* \* \*